(12) United States Patent
Hahn et al.

(10) Patent No.: US 9,452,723 B2
(45) Date of Patent: Sep. 27, 2016

(54) ENERGY ABSORPTION STRUCTURE FOR A MOTOR VEHICLE

(71) Applicant: Bayerische Motoren Werke Aktiengesellschaft, Munich (DE)

(72) Inventors: Wolfgang Hahn, Petershausen (DE); Timm Freudenberg, Munich (DE)

(73) Assignee: Bayerische Motoren Werke Aktiengesellschaft

( * ) Notice: Subject to any disclaimer, the term of this patent is extended or adjusted under 35 U.S.C. 154(b) by 0 days.

(21) Appl. No.: 14/801,389

(22) Filed: Jul. 16, 2015

(65) Prior Publication Data

US 2015/0321631 A1    Nov. 12, 2015

Related U.S. Application Data

(63) Continuation of application No. PCT/EP2014/050619, filed on Jan. 14, 2014.

(30) Foreign Application Priority Data

Jan. 17, 2013    (DE) .................. 10 2013 200 678

(51) Int. Cl.
| | |
|---|---|
| *B60R 19/34* | (2006.01) |
| *B60R 19/03* | (2006.01) |
| *F16F 7/08* | (2006.01) |
| *B60R 19/18* | (2006.01) |
| *B60R 19/26* | (2006.01) |

(52) U.S. Cl.
CPC .............. *B60R 19/34* (2013.01); *B60R 19/03* (2013.01); *F16F 7/08* (2013.01); *B60R 2019/1853* (2013.01); *B60R 2019/266* (2013.01)

(58) Field of Classification Search
CPC .............. B60R 19/34; B60R 19/03; B60R 2019/1853; B60R 2019/266; F16F 7/08
USPC .................................. 296/120, 132, 133, 122
See application file for complete search history.

(56) References Cited

U.S. PATENT DOCUMENTS

| 5,404,974 A | * | 4/1995 | Thum ..................... F16F 7/123 |
| | | | 188/372 |
| 5,729,463 A | * | 3/1998 | Koenig ................... B23K 11/11 |
| | | | 700/98 |

(Continued)

FOREIGN PATENT DOCUMENTS

| CN | 1351555 A | 5/2002 |
| CN | 2618820 Y | 6/2004 |

(Continued)

OTHER PUBLICATIONS

International Search Report dated Mar. 27, 2014 (Two (2) pages).

(Continued)

*Primary Examiner* — Pinel Romain
(74) *Attorney, Agent, or Firm* — Crowell & Moring LLP (57) ABSTRACT

An energy absorption structure for a vehicle has an energy absorption element, in particular an engine longitudinal carrier, and at least one impact transmission element, which impact transmission element is pressed against a side wall of the engine longitudinal carrier and, in the event of an impact, is guidable along the side wall, wherein the engine longitudinal carrier is a fiber composite component and the impact transmission element has a microstructure which can be countersunk into the engine longitudinal carrier.

12 Claims, 5 Drawing Sheets

(56) References Cited

U.S. PATENT DOCUMENTS

| | | | |
|---|---|---|---|
| 6,601,886 B1 | 8/2003 | Thayer | |
| 6,705,667 B1 * | 3/2004 | Bartesch | B62D 21/10 296/181.7 |
| 6,820,924 B2 * | 11/2004 | Caliskan | B62D 21/15 188/377 |
| 7,393,029 B2 * | 7/2008 | Glasgow | B60N 2/4235 293/132 |
| 7,630,871 B2 * | 12/2009 | Cole | G06F 17/5018 700/146 |
| 7,992,926 B2 * | 8/2011 | Tamakoshi | B62D 21/155 296/187.09 |
| 8,146,300 B2 * | 4/2012 | Bystricky | E04H 9/021 52/167.1 |
| 2014/0333077 A1 * | 11/2014 | Kil | B60R 19/03 293/132 |

FOREIGN PATENT DOCUMENTS

| | | | |
|---|---|---|---|
| CN | 1681689 A | 10/2005 | |
| CN | 101683836 A | 3/2010 | |
| CN | 202557460 U | 11/2012 | |
| DE | 21 54 991 A1 | 5/1973 | |
| DE | 202 20 575 U1 | 11/2003 | |
| DE | 10 2004 059 545 A1 | 6/2006 | |
| DE | 10 2010 020 080 A1 | 11/2011 | |
| EP | 0 163 524 B1 | 5/1989 | |
| EP | 1762439 A1 * | 3/2007 | B60R 19/34 |
| EP | 2 511 141 A1 | 10/2012 | |
| WO | WO 2004/113131 A1 | 12/2004 | |
| WO | WO 2007075659 A2 * | 7/2007 | B60R 19/18 |

OTHER PUBLICATIONS

German Search Report dated Sep. 17, 2013, with Statement of Relevancy (Six (6) pages).

Chinese Office Action issued in Chinese counterpart application No. 201480012904.4 dated Jul. 20, 2016, with English translation (Twelve (12) pages).

* cited by examiner

ENERGY ABSORPTION STRUCTURE FOR A MOTOR VEHICLE

CROSS REFERENCE TO RELATED APPLICATIONS

This application is a continuation of PCT International Application No. PCT/EP2014/050619, filed Jan. 14, 2014, which claims priority under 35 U.S.C. §119 from German Patent Application No. 10 2013 200 678.0, filed Jan. 17, 2013, the entire disclosures of which are herein expressly incorporated by reference.

BACKGROUND AND SUMMARY OF THE INVENTION

The invention relates to an energy absorption structure for a vehicle, having an absorption of energy element and at least one impact transmission element, which impact transmission element is pressed against a side wall of the absorption of energy element and, in the event of an impact, can be guided along the side wall.

Impact or crash structures made of carbon-fiber-reinforced plastic ("CFRP") are currently predominantly used in vehicles as carriers with a rectangular or round profile cross section. In the event of an impact, the failure mechanism of what is referred to as crushing is applied to absorb energy. In the event of crushing, complete disintegration (pulverization) of the carrier takes place predominantly through brittle fracturing, to be precise successively at an end-side "crash front" which penetrates further and further into the carrier as the impact progresses. A further form of destruction of the impact structure is the defined deflection of the CFRP material through 180° directly at the crash front ("fronting"). In this context, the fiber fracturing mechanism in conjunction with friction comes into effect in order to dissipate the kinetic energy.

In the event of a head-on impact, the two failure mechanisms function in the longitudinal direction of the carrier in which the force is perpendicular to the carrier cross section. However, under the influence of transverse forces, structures which are configured for these failure mechanisms fail in a largely uncontrolled and catastrophic fashion unless costly additional structural measures are provided to absorb the transverse forces. Analytic treatment of the failure modes is currently not possible. In addition, an unfavorable dependence of the CFRP material on temperature becomes apparent, since the absorbed energy generally decreases at relatively high temperatures.

DE 10 2010 020 080 A1 discloses a bumper arrangement for a motor vehicle, which bumper arrangement has a transverse carrier and a crashbox, wherein the transverse carrier is coupled via a guide profile to the crashbox and the guide profile is connected in a relatively movable fashion to the crashbox, wherein a clip for coupling to the crashbox is provided on the guide profile. However, this does not bring about any increased absorption of energy.

DE 10 2004 059 545 A1 discloses a device for absorbing energy, in particular in the event of a collision of a vehicle with a solid body. The absorption of energy device comprises a movable shock impact transmission element and a locking device for influencing the mobility of the shock impact transmission element. The shock impact transmission element can be locked rigidly in a first, minimum impact speed region by means of the locking device, whereas in a second, high impact speed range the shock impact transmission element can move in an essentially force-free fashion. The absorption of energy device is distinguished by the fact that the locking device also permits the relative movement of the shock impact transmission element within the entire movement stroke in a third, central impact speed range. In this context, the absorption of energy device comprises a shaping arrangement which can be controlled by the locking device as a function of the crash, for the defined plastic deformation of material, wherein the shaping arrangement can be driven by the relative movement of the shock impact transmission element. However, this shaping arrangement is suitable only for deforming metallic material and not for non-ductile fiber composite materials.

The object of the present invention is to overcome the disadvantages of the prior art, at least partially, and in particular, to make available improved absorption of energy on fiber composite elements.

This object is achieved according to the features of the independent claims. Preferred embodiments can be found, in particular, in the dependent claims.

The object is achieved by an energy absorption structure for a vehicle comprising a first element, referred to below as "absorption of energy element", and at least one second element, referred to below as "impact transmission element". The impact transmission element is pressed against a side wall of the absorption of energy element and, in the event of an impact, can be guided or displaced along the side wall. In other words, in the event of an impact or crash, the impact transmission element is guided along the side wall, or pulled or pushed over the side wall, at least for a certain distance.

The absorption of energy element is a fiber composite component, with the result that absorption of energy is not brought about by its plastic deformation. Instead, the impact transmission element has a microstructure which can be or is countersunk into the absorption of energy element or into the fiber composite component. As a result, positive locking with the absorption of energy element is achieved, with the result that in the event of an impact the microstructure "ploughs", scratches or claws superficially, in accordance with its penetration depth, through the absorption of energy element. As a result, the side wall is superficially destroyed in the path of the absorption of energy element or of the microstructure. This superficial destruction gives rise to a high level of absorption of energy at the absorption of energy element, without destroying the absorption of energy element by the movement of the impact transmission element over the entire depth. As a result of the retention of the absorption of energy element as such, said element has a residual load-bearing capacity there, which permits the structural integrity to be maintained after an impact. In addition, the failure mode is independent of a force introduction angle, with the result that the carrier itself can be dimensioned for any desired transverse forces.

The degree of destruction of the surface, which correlates to the absorption of energy, can be influenced, in particular, by the penetration depth or pressing in depth of the microstructure, the pressing force during the impact or the displacing and by the shape and arrangement of the microstructure. In particular, in this way, a common property is made possible for different vehicle variants. The scaling of the absorption of energy and of the associated force level can consequently be carried out with a constant component geometry (for example with respect to a profile cross section and wall thickness).

The fact that the microstructure can be countersunk includes the case in which the microstructure is countersunk in the absorption of energy element, that is to say, in particular, is also already countersunk in the non-displaced state (state of rest). The fact that the microstructure can be countersunk also includes the other case in which in the state of rest the microstructure is not yet countersunk in the absorption of energy element, or only is so to a slight degree, but is countersunk or pressed in with a displacement relative to the absorption of energy element.

The energy absorption structure may be, for example, an impact structure or crash structure of the vehicle, for example a front-side or rear-side crash structure.

The vehicle may be, in particular, a motor vehicle, in particular a passenger motor vehicle.

The absorption of energy element may be, in particular, an engine longitudinal carrier ("MLC").

The absorption of energy element may, as a fiber composite component, have glass-fiber-reinforced plastic, referred to for short as GFRP, carbon-fiber-reinforced plastic, also referred to as CFRP, or aramide as the fiber composite material.

The microstructure may be distinguished, in particular, by the fact that the individual structural elements (for example individual teeth) have size values in the micrometer range, that is to say do not exceed one millimeter. Therefore, in particular a penetration depth may be limited to a value of one millimeter or less. This is substantially less than a wall thickness of an associated side wall of typically at least three millimeters or more. The comparatively small height of the microstructure prevents complete destruction of the side wall over its entire depth in the path of the microstructure. However, the microstructure is not limited thereto. For example, a penetration depth may also measure more than one millimeter, for example if a thickness of the absorption of energy element measures more than three millimeters. It is a development that a height or a penetration depth of the microstructure is not more than a third of a thickness of the absorption of energy element below the microstructure, preferably not more than a quarter of the thickness. In this way it can also be achieved that the absorption of energy element is only superficially destroyed.

The fact that the impact transmission element can be guided along the side wall in the event of an impact means, drawing the reverse conclusion, that in a state of rest or normal state without an impact or in the event of an impact with such a low level of energy that the impact transmission element is not (relatively) displaced, the impact transmission element remains in a normal position or position of rest on the absorption of energy element.

So that the microstructure does not experience wear or self-destruction during its displacement, it is advantageous for it to have a greater degree of hardness and/or greater strength than the fiber composite material.

It is a development that the impact transmission element has a microstructure composed of metal and/or ceramic. In particular, the impact transmission element may be composed of metal, for example of steel.

Bending of the absorption of energy element during the guiding or displacement of the impact transmission element could lead to nonuniform destruction of the surface thereof. It is therefore preferred for the absorption of energy element to be a virtually rigid and stiff element.

It is a development that the impact transmission element can be guided, in the event of an impact, along the side wall by a crashbox, a deformation box ("defobox") or a bumper. The impact transmission element may alternatively constitute part of these functional elements.

It is a refinement that in a normal state or state of rest (without an impact or with only a slight impact) the impact transmission element is micro-serrated to the absorption of energy element in a positively locking fashion. As a result, absorption of energy or energy dissipation is already achieved immediately at the start of a relative displacement of these two elements. Micro-serration can be understood to mean, in particular, that the countersunk microstructure and the corresponding region of the absorption of energy element are shaped in such a way that they engage in each other without play. In particular, the two elements may have a complementary shape in this case.

It is also a refinement that at least one impact transmission element is arranged on an outer side of the side wall of the absorption of energy element or fiber composite component. This permits particularly simple attachment and can be applied even in the case of a non-hollow or solid absorption of energy element.

It is a further refinement that at least one absorption of energy element is a hollow element, in particular a hollow profile, and the impact transmission element is arranged on an inner side of the side wall. This permits a particularly compact design.

It is also a further refinement that at least one deformation element has a microstructure with a field of cone-like (i.e. cone-shaped and/or frustrum-shaped) and/or pyramid-like (i.e. pyramid-shaped and/or truncated-pyramid-shaped) (micro) projections. These permit dissipation of energy, which dissipation is at least largely independent of a direction of displacement of the impact transmission element.

It is also a refinement that at least one impact transmission element has a microstructure with a field of elongated projections which are arranged parallel to one another. The elongated projections may have, for example, a triangular cross-sectional shape and have, for example, a hipped-roof-like basic shape. The elongated projections can also be considered to be fins. Such a microstructure has the advantage that, given orientation of the elongated projections in an envisaged direction of displacement, uniform dissipation of energy over the travel is assisted, for example by a reduction in a load peak or force peak at the start of the displacement process. In this refinement, removal of destroyed fiber composite material from the path of the impact transmission element is also assisted. As a result, the accumulation of material under the impact transmission element can be counteracted.

It is also a refinement that at least one impact transmission element has a microstructure with a field of V-shaped projections. This also brings about more uniform dissipation of energy, in particular if the V-shaped projections are oriented with their tip in a provided displacement direction. Removal of destroyed fiber composite material is also assisted here.

However, the shape of the microstructure is not limited thereto and may, for example, also have a field of irregularly arranged and/or irregularly shaped projections. The irregular microstructures may form, in particular, a rough surface with a defined roughness.

In addition, it is a refinement that the absorption of energy element is a profile element, that is to say an elongated element, which has an at least substantially identical cross-sectional shape at least over one section over which the impact transmission element is guided ("path"). In this context, slight deviations from the basic shape may occur locally, for example through the provision of holes or the like. The refinement as a profile element has the advantage that a displacement or a path of the impact transmission element can take place in a plane which is parallel to the longitudinal extent of the absorption of energy element, in particular linearly. Therefore, uniform displacement of the impact transmission element against the absorption of energy element is achieved again, and also uniform dissipation of energy.

The absorption of energy element may be, for example, an O-shaped, U-shaped or C-shaped profile element, in particular with a rectangular cross section.

However, the invention is not limited thereto, and the absorption of energy element may have, for example, a cross-sectional shape and/or size which changes over the length of the path of the impact transmission element. For example, the absorption of energy element may widen in the direction of the path of the impact transmission element and therefore, if appropriate, a contact pressure, therefore a degree of destruction and consequently absorption of energy of the absorption of energy element, can increase with an increasing length of the displacement.

It is also a refinement that a least one impact transmission element is plate-shaped. This has the advantage of easy manufacture. In particular, one side of the plate may be at least partially in contact with the absorption of energy element, and an associated contact face can have the microstructure. The microstructure may be arranged coherently or in a plurality of partial surfaces, spaced apart from one another, on the impact transmission element.

In addition, it is a refinement that at least one impact transmission element is attached to at least one side wall of the (then hollow) absorption of energy element by means of at least one screw or a rivet. As a result, in the normal state firstly the impact transmission element can be attached securely and precisely to the absorption of energy element. Secondly, in the event of an impact an even greater quantity of energy can therefore be transmitted to the absorption of energy element, since with the displacement of the impact transmission element the at least one screw or the one rivet is also pulled through the absorption of energy element. As a result, a continuous fracture line can be pulled through the absorption of energy element in the path of the screw or of the rivet, and/or a slit can be generated behind the screw or the rivet, for the generation of which energy is additionally required. The failure mechanism which is used is based on the bearing stress. In this context, strips of only superficially destroyed fiber composite material are present between the at least one fracture line, with the result that despite the high absorption of energy the absorption of energy element has residual strength or residual load-bearing capacity. The use of the at least one screw or of the one rivet has the further advantage that in this way a pressing force of the impact transmission element on the absorption of energy element can be adjusted. Particularly precise adjustment is provided when a screw is used.

In one development, the screw or the rivet may be guided only through that wall in the absorption of energy element to which the associated impact transmission element is attached. In another development, the screw or the rivet may be guided through two, in particular opposite, walls. In particular, an impact transmission element may be attached in each case to opposite walls of the (then hollow) absorption of energy element, in particular by means of at least one common screw. This permits particularly uniform absorption of energy on both sides as well as particularly simple mounting.

Instead of or in addition to the at least one screw and/or the at least one rivet, any other attachment element which connects the impact transmission element to the absorption of energy element in a positively locking fashion, and preferably also in a frictionally locking fashion, and which can generate fracture lines in the absorption of energy element, may also be used.

It is also a refinement that the plate-shaped impact transmission element is pre-curved before mounting, and in the mounted state is attached against its curvature to the absorption of energy element. In this way, a particularly high pressing force is generated, which particularly reliably ensures a sufficient insertion depth or penetration depth of the microstructure in the absorption of energy element even in the case of high displacement speeds of the impact transmission element. In particular, the impact transmission element may be pre-curved so as to protrude from the absorption of energy element.

It is also a further refinement that at least one impact transmission element is a bi-metal element which brings about a higher pressing force as the temperature increases. As a result, absorption of energy which is less when the temperature is relatively high can be at least partially compensated by fiber composite material.

In addition, it is a further refinement that at least one impact transmission element is a bi-metal element which makes available a larger surface of the countersunk microstructure as the temperature increases. It is therefore also achieved that absorption of energy which is less when the temperature is relatively high can be at least partially compensated by fiber composite material. The provision of the relatively large area of the microstructure can be implemented, for example, by virtue of the fact that the impact transmission element is a bi-metal element which is partially curved away from the absorption of energy element, and the curvature thereof reduces as the temperature increases. As a result, as the temperature increases a larger area of the microstructure bears on the absorption of energy element.

Basically, the energy absorption structure may have one or more absorption of energy elements which can each be assigned one or more impact transmission elements in turn.

In order to mount the impact transmission element on the absorption of energy element, it is preferred to countersink, in particular to press, the microstructure into the absorption of energy element. Subsequently, in particular after the implementation of a positively locking arrangement, the contact pressure can be reduced, if appropriate. The remaining (reduced) contact pressure is preferably dimensioned in such a way that the toothed arrangement during the (relative) displacement in the absorption of energy element remains and it does not become detached from the surface of the absorption of energy element.

In the following figures, the invention will be described in more schematically accurate detail on the basis of exemplary embodiments. In this context, for the sake of clarity identical or identically acting elements can be provided with the same reference symbols.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
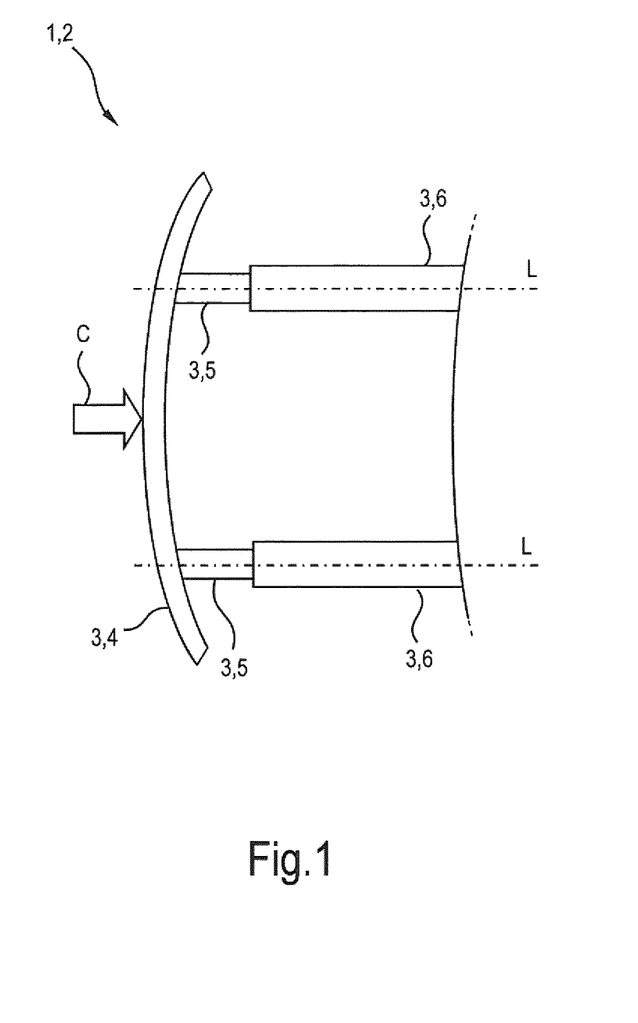
FIG. 1 shows a plan view of a sketch of a front part of the vehicle with an associated impact structure.

FIG. 1 shows a plan view of a sketch of a front part 1 of a passenger motor vehicle 2 with an associated energy absorption structure in the form of a crash structure or impact structure 3. The impact structure 3 has a front bumper 4 which is attached to two crashboxes 5. In the normal state or state of rest which is shown, the crashboxes 5 are introduced partially into absorption of energy elements in the form of respective engine longitudinal carriers 6. The engine longitudinal carriers 6 are embodied as tubular hollow profiles made of CFRP with a rectangular cross-sectional shape. The crashboxes 5 also have a rectangular basic shape and are arranged in a longitudinally displaceable fashion in the engine longitudinal carrier 6.

In the event of a head-on impact at a relatively high speed, said impact being indicated by the arrow C, the bumper 4 has hitherto been displaced with the crashboxes 5 in such a way that they impact on the engine longitudinal carriers 6 and destroy them by dissipating energy. Since the engine longitudinal carriers 6 are composed of CFRP, energy is not absorbed through plastic deformation but instead the engine longitudinal carriers 6 have hitherto been destroyed through complete disintegration (pulverization) and/or deflection of the CFRP material (fronting). However, under the influence of transverse forces, such as occur, for example in the event of a side impact, previous engine longitudinal carrier 6 have previously failed in a largely uncontrolled and catastrophic fashion, for example by bending in, with a markedly lower degree of absorption of energy.

Figure 2:
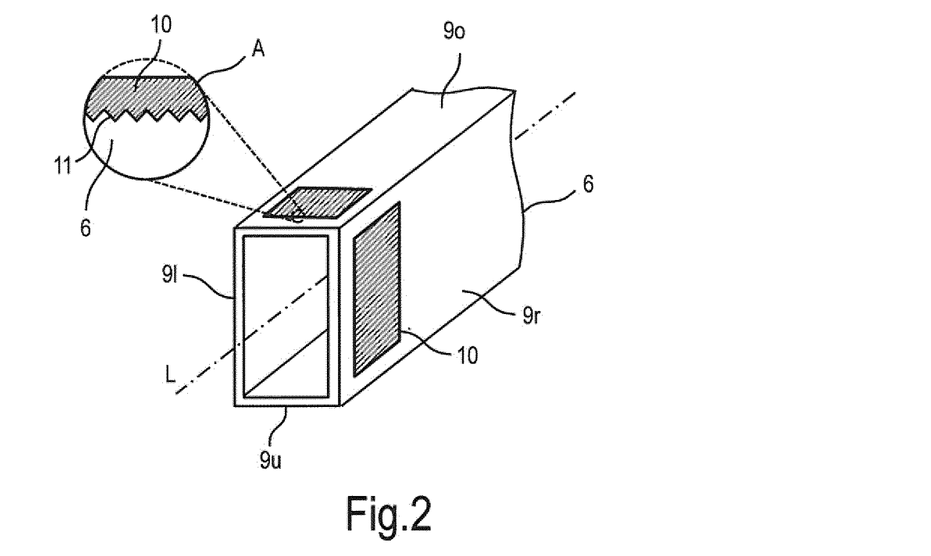
FIG. 2 shows an oblique view of the engine longitudinal carrier in the state of rest with a plurality of impact transmission elements attached thereto, according to a first exemplary embodiment.

FIG. 2 shows an oblique view of the engine longitudinal carrier 6 in a state of rest or normal state with a plurality of impact transmission elements 10 attached thereto, according to a first exemplary embodiment. In this respect, a respective plate-shaped impact transmission element 10 is countersunk on the outside of each side wall 9 of the engine longitudinal carrier 6, specifically on a right-hand side wall 9r, on an upper side wall 9o, on a left-hand side wall 9l and on a lower side wall 9u. The impact transmission elements 10 are composed of metal, for example steel, and have, on their side which is countersunk into the side walls 9, a microstructure 11 composed of protruding microprojections, as shown in a sectional view in the detail A.

As is shown further in the detail A, the microstructure 11 is countersunk in a positively locking fashion into the outer side of the side wall 9o, which is used here by way of example, with the result that the side wall 9o assumes a complementary shape there. A penetration depth of the microstructure 11 is not more than a millimeter, which is considerably less than a wall thickness of the side wall 9o of more than three millimeters.

Figure 4:
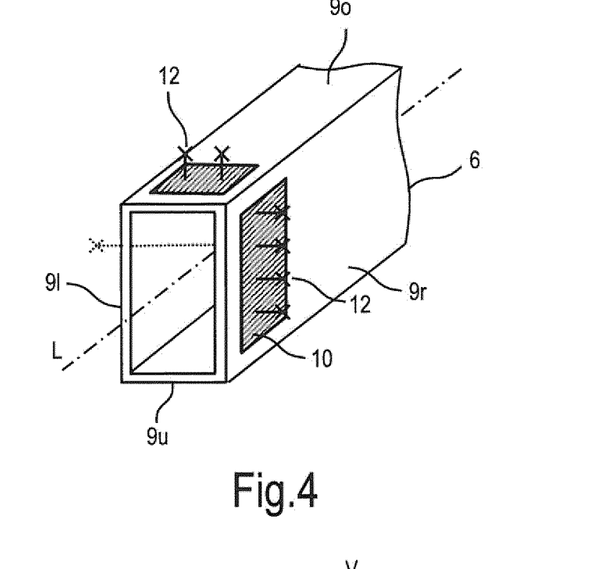
FIG. 4 shows an oblique view of the engine longitudinal carrier in the state of rest with a plurality of impact transmission elements attached thereto, according to a second exemplary embodiment.
Figure 5:
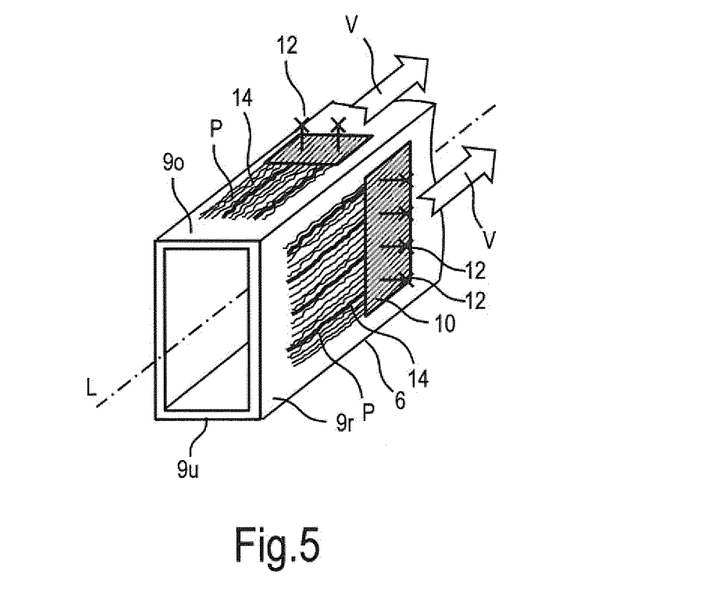
FIG. 5 shows an oblique view of the engine longitudinal carrier according to the second exemplary embodiment in the impact state.

The impact transmission elements 10 can be pressed, in particular, against the engine longitudinal carrier 6, for example by means of a corresponding pressing device or by means of corresponding attaching elements such as screws or rivets (top illustration, see also FIG. 4 and FIG. 5).

In one alternative refinement, in the state of rest the impact transmission elements 10 only bear under pressure on the side wall 9, wherein the microstructure 11 is only partially countersunk into the side wall 9, or even not at all. The penetration depth increases only when there is displacement in the event of an impact, with the result that the impact transmission elements 10 or the microstructure 11 thereof can then "dig" into the side wall 9 as far as the level of the microstructure 11.

Figure 3:
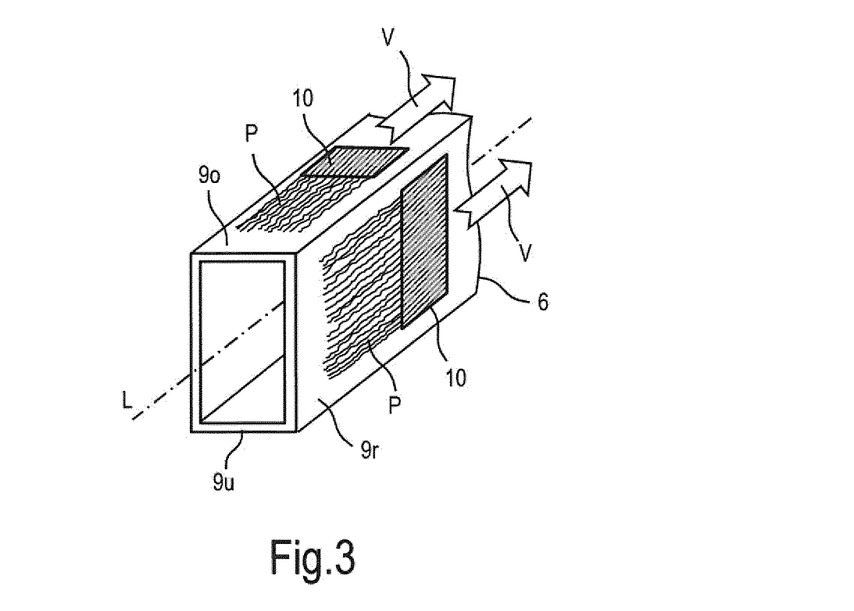
FIG. 3 shows an oblique view of the engine longitudinal carrier according to the first exemplary embodiment in the impact state.

FIG. 3 shows an oblique view of the engine longitudinal carrier 6 in the event of an impact. In the event of an impact, the impact transmission elements 10 are displaced along the associated side walls 9 or 9o, 9u, 9r, 9l in a displacement direction V, and remain under pressure here. The outside impact transmission elements 10 can be displaced, for example, by an associated crashbox 5 or a component connected thereto. During the displacement, the microstructure 11 claws or ploughs superficially through the side walls 9 and destroys the fiber composite material in its path P, here a CFRP material. However, the side walls 9 are not destroyed over their entire depth or thickness, with the result that they retain a significant structural strength.

Alternatively or additionally, at least one impact transmission element 10 may be countersunk on an inner side of the side walls 9 of the engine longitudinal carriers 6 (upper illustration). For example, such an impact transmission element 10 may be integrated into one of the crashboxes 5, or a crashbox 5 may serve as a carrier for at least one impact transmission element 10.

FIG. 4 shows an oblique view of the engine longitudinal carrier 6 in the state of rest with a plurality of impact transmission elements 10 which are attached thereto and which are then screwed onto the side walls 9 by means of screws 12. The screws 12 are for this purpose guided entirely through the respective side walls 9. The contact pressure of the impact transmission elements 10 on the side walls 9 can be adjusted precisely by means of selective tightening of the screws 12.

The screws 12 may, for example, be arranged in series one behind the other in the longitudinal direction (i.e. in series with respect to the longitudinal axis L or in a provided displacement direction V). This permits particularly secure attachment of the impact transmission elements 10. Additionally or alternatively it is possible, as shown here, to arrange screws 12 in parallel and offset with respect to the longitudinal axis L of the engine longitudinal carrier 6 or to the displacement direction V. This may also bring about particularly secure attachment of the impact transmission elements 10, and in addition a high number of screws 12, by which means an increase in the absorption of energy can be brought about. However, other arrangements are also basically possible. The crashbox 5 (not illustrated) is introduced into the illustrated front opening of the engine longitudinal carrier 6, specifically at maximum to a stop with the screws 12.

In addition to or as an alternative to the screws 12, which are guided through just one of the side walls 9 or 9o, 9u, 9r, 9l, it is, for example, also possible to guide correspondingly longer screws through opposite side walls 9 (for example 9o and 9u or 9r and 9l) and in this way attach two impact transmission elements 10 with one screw. Such a continuous screw is indicated by dotted lines and would draw together here the impact transmission elements 10 of the right-hand side wall 9r and of the left-hand side wall 9l, and in this way press against the associated side walls 9r or 9l. This permits particularly uniform absorption of energy on both opposite side walls 9, as well as facilitated mounting.

FIG. 5 shows an oblique view of the engine longitudinal carrier 6 in the event of an impact. The crashbox 5 has then displaced the impact transmission elements 10 rearward in the displacement direction V, wherein in addition to the destruction of the outer side of the side walls 9 of the engine longitudinal carrier 6 the screws 12 pull, in their track, through the side walls 9 and thereby form continuous slits or fracture lines 14 for the increased absorption of energy. However, the side walls 9 are not completely destroyed as in the event of a crash front, but instead have considerable structural strength. The crashbox 5 or the like can press on the impact transmission elements 10 as such and/or on the screws 12 in order to displace the impact transmission elements 10. In order to generate long fracture lines 14, an arrangement of the screws 12 which is offset in parallel is preferred.

Figure 6:
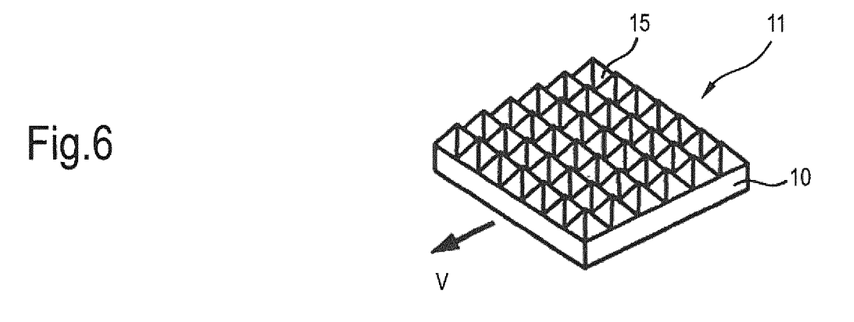
FIG. 6 shows an oblique view of a possible microstructure of an impact transmission element.

FIG. 6 shows an oblique view of a possible microstructure 11 of the impact transmission element 10. The microstructure 11 has here a field of densely packed micro-projections in the form of pyramid-like teeth 15. These teeth 15 have a height of not more than one millimeter.

Figure 7:
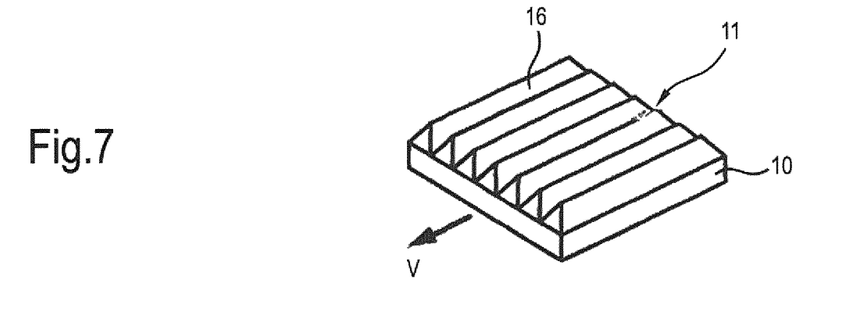
FIG. 7 shows an oblique view of a further possible microstructure of an impact transmission element.

FIG. 7 shows an oblique view of a further possible microstructure 11 of the impact transmission element 10. The microstructure 11 has here a field of densely packed micro-projections in the form of hipped-roof-like fins 16 with a height of not more than one millimeter. The fins 16 are preferably oriented parallel to the provided displacement direction V of the impact transmission element 10. The use of the fins 16 permits more effective displacement or expulsion of destroyed fiber composite material than the teeth 15, as well as more uniform loading.

Figure 8:
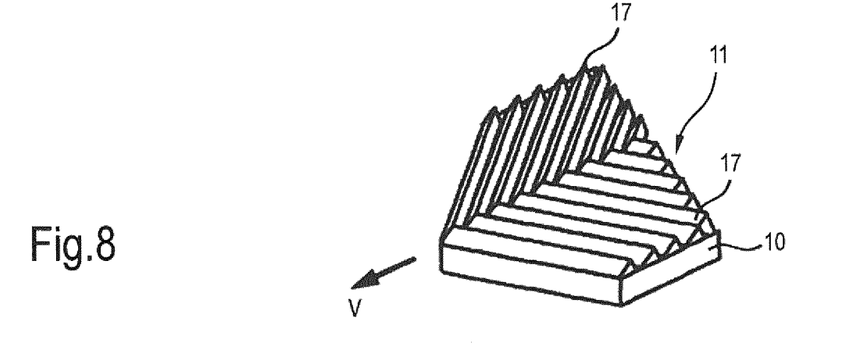
FIG. 8 shows an oblique view of yet a further possible microstructure of an impact transmission element.

FIG. 8 shows an oblique view of yet a further possible microstructure 11 of the impact transmission element 10. The microstructure 11 has a field of densely packed micro-projections in the form of V-shaped fins 17 which are oriented in the provided displacement direction V of the impact transmission element 10. The fins 17 permit yet more effective displacement or expulsion of destroyed fiber composite material as well as also more uniform loading.

Figure 9:
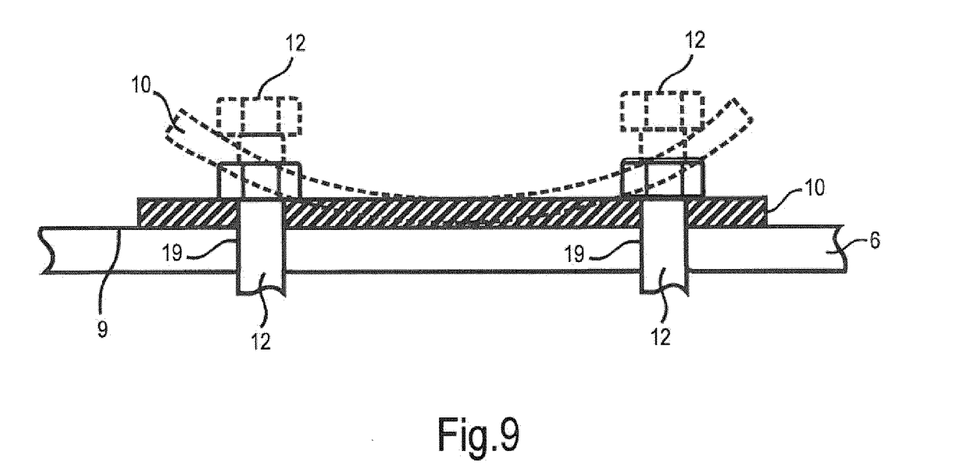
FIG. 9 shows, as a sectional representation in a side view, the engine longitudinal carrier in the state of rest with an impact transmission element attached thereto, according to a third exemplary embodiment.

FIG. 9 shows, as a sectional illustration in a side view, the engine longitudinal carrier 6 in the state of rest with an impact transmission element 10 attached thereto, wherein the plate-shaped impact transmission element 10 is pre-curved, in particular curved away from the engine longitudinal carrier 6. The impact transmission element 10 is illustrated by dashed lines in the pre-mounted, curved state, and is illustrated with continuous lines in the mounted state in which it is pressed straight. The curvature or the radius of curvature and therefore the contact pressure can be easily and precisely adjusted by means of the two screws 12. Thereby considerably higher and at the same time more easily reproducible contact pressure can be achieved than in the case of a non-pre-curved impact transmission element 10. The microstructure may be located at least between the two screws 12 or the associated through-bores 19 and can, if appropriate, also extend laterally beyond them.

Figure 10:
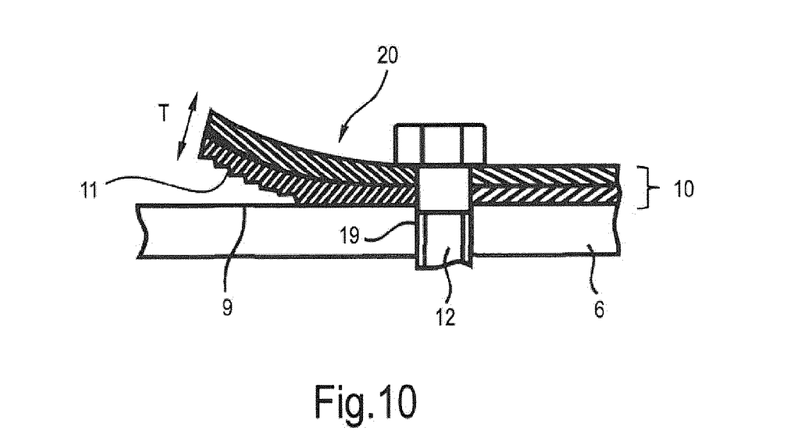
FIG. 10 shows, as a sectional representation in a side view, the engine longitudinal carrier in the state of rest with an impact transmission element attached thereto, according to a fourth exemplary embodiment.

FIG. 10 shows a detail of the engine longitudinal carrier 6 in the state of rest with a plate-shaped impact transmission element 10 which is attached thereto and which is embodied here as a bi-metal element in a shape similar to the shape from FIG. 9. The impact transmission element 10 protrudes upward on a free end region 10, present to the side of the screws 12, at low temperatures T as a result of the bi-metal effect, with the result that a microstructure 11 of the impact transmission element 10 is countersunk into the side wall 9 of the engine longitudinal carrier 6 only between the screws 12. As the temperature increases, the curvature of the free end region 20 is reduced, and said end region 20 is progressively lowered onto the side wall 9. Since the free end region 20 is also equipped on its side facing the side wall 9 with a microstructure, as the temperature T increases the area of the microstructure which is in contact with the side wall 9, and therefore the absorption of energy, increase. This increased absorption of energy as a result of contact over a larger area compensates a lower absorption of energy of the fiber composite materials at relatively high temperatures T.

The present invention is obviously not limited to the exemplary embodiments shown.

Instead of screws it is therefore also possible to use rivets or bolts.

Generally, the features of the above exemplary embodiments can be interchanged and/or combined with one another as desired.

Generally, "a", "an" or "one" can be understood as meaning a singular or a plural, in particular in the sense of "at least one" or "one or more" etc. as long as this is not explicitly ruled out, for example by the expression "precisely one" etc.

Numerical information can also include the specified number as well as a customary tolerance range unless this is explicitly ruled out.

LIST OF REFERENCE SYMBOLS

1 Front part of the vehicle
2 Passenger motor vehicle
3 Crash structure or impact structure
4 Front bumper
5 Crashbox
6 Engine longitudinal carrier
9 Side wall
9l Left-hand side wall
9o Upper wall
9r Right-hand side wall
9u Lower side wall
10 Impact transmission element
11 Microstructure
12 Screw
14 Fracture line
15 Pyramid-like tooth
16 Hipped-roof-like fin
17 V-shaped fin
19 Through-bore
20 End region
A Detail
C Head-on impact L Longitudinal axis
P Path
T Temperature
V Displacement direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy absorption structure for a vehicle, comprising:
   an absorption of energy element formed as a fiber composite engine longitudinal member; and
   at least one impact transmission element which is pressed against a side wall of the absorption of energy element and, in the event of an impact, can be guided along the side wall, wherein the at least one impact transmission element has a microstructure which can be countersunk into the absorption of energy element,
   wherein, in a normal state, the impact transmission element is micro-serrated to the absorption of energy element in a positively locking fashion.

2. The energy absorption structure as claimed in claim 1, wherein at least one of the at least one impact transmission element is arranged on an outer side of the side wall of the absorption of energy element.

3. The energy absorption structure as claimed in claim 2, wherein the absorption of energy element is a hollow profile, and the impact transmission element is arranged on an inner side of the side wall of the absorption of energy element.

4. The energy absorption structure as claimed in claim 1, wherein the absorption of energy element is a hollow profile, and the impact transmission element is arranged on an inner side of the side wall of the absorption of energy element.

5. The energy absorption structure as claimed in claim 1, further comprising at least one deformation element that has a microstructure with a field of cone-like or pyramid-like projections.

6. The energy absorption structure as claimed claim 1, wherein at least one of the at least one impact transmission element has a microstructure with a field of elongated projections which are arranged parallel to one another.

7. The energy absorption structure as claimed claim 1, wherein at least one of the at least one impact transmission element has a microstructure with a field of V-shaped projections.

8. The energy absorption structure as claimed in claim 1, wherein the absorption of energy element is a profile element.

9. An energy absorption structure for a vehicle, comprising:
   an absorption of energy element formed as a fiber composite engine longitudinal member; and
   at least one impact transmission element which is pressed against a side wall of the absorption of energy element and, in the event of an impact, can be guided along the side wall, wherein the at least one impact transmission element has a microstructure which can be countersunk into the absorption of energy element,
   wherein at least one of the at least one impact transmission element is plate-shaped and is attached to at least one side wall of the absorption of energy element by at least one screw or rivet.

10. The energy absorption structure as claimed in claim 9, wherein the plate-shaped impact transmission element is pre-curved.

11. An energy absorption structure for a vehicle, comprising:
    an absorption of energy element formed as a fiber composite engine longitudinal member; and
    at least one impact transmission element which is pressed against a side wall of the absorption of energy element and, in the event of an impact, can be guided along the side wall, wherein the at least one impact transmission element has a microstructure which can be countersunk into the absorption of energy element,
    wherein at least one of the at least one impact transmission element is a bi-metal element which provides a higher pressing force as temperature increases.

12. An energy absorption structure for a vehicle, comprising:
    an absorption of energy element formed as a fiber composite engine longitudinal member; and
    at least one impact transmission element which is pressed against a side wall of the absorption of energy element and, in the event of an impact, can be guided along the side wall, wherein the at least one impact transmission element has a microstructure which can be countersunk into the absorption of energy element,
    wherein at least one impact transmission element is a bi-metal element which makes available a larger surface of the countersunk microstructure as temperature increases.

* * * * *